United States Patent
Shimizu et al.

[11] 3,918,055
[45] Nov. 4, 1975

[54] CLUTTER SIGNAL SUPPRESSION RADAR

[75] Inventors: Hirotoshi Shimizu, Kobe; Toshiaki Uozumi, Kakogawa, both of, Japan

[73] Assignee: Fugitsu Limited, Kawasaki, Japan

[22] Filed: July 13, 1973

[21] Appl. No.: 378,817

[30] Foreign Application Priority Data
July 14, 1972    Japan .................... 47-70494

[52] U.S. Cl. ............ 343/5 R; 343/12 R; 343/100 PE
[51] Int. Cl.² ........................... G01S 9/02; G01S 9/37
[58] Field of Search ............ 343/5 R, 12 R, 100 PE

[56] References Cited
UNITED STATES PATENTS

| | | | |
|---|---|---|---|
| 3,049,703 | 8/1962 | Davis | 343/100 PE X |
| 3,111,668 | 11/1963 | Kuecken | 343/100 PE |
| 3,369,234 | 2/1968 | Bush et al. | 343/100 PE |
| 3,378,843 | 4/1968 | Sherman | 343/16 M |
| 3,403,394 | 9/1968 | Rouault | 343/5 R |
| 3,566,403 | 2/1971 | Hills | 343/5 R |
| 3,706,989 | 12/1972 | Taylor, Jr. | 343/7.5 X |
| 3,760,274 | 9/1973 | Vogt | 343/100 PE X |

Primary Examiner—Malcolm F. Hubler
Attorney, Agent, or Firm—Staas & Halsey

[57] ABSTRACT

A clutter signal suppression radar which has at least one antenna simultaneously emitting waves of different planes of polarization and receiving reflected waves, a pair of amplifiers amplifying the signals of different planes of polarization received by the antenna, a pair of phase detectors supplied with the outputs from the amplifiers and detecting them and a pair of signal processors extracting frequency spectrums of a target signal in the outputs from the detectors, whereby a clutter signal is suppressed to enable discrimination of small targets.

5 Claims, 10 Drawing Figures

3,918,055

CLUTTER SIGNAL SUPPRESSION RADAR

BACKGROUND OF THE INVENTION

1. Field of the Invention

This invention relates to a radar system which suppresses clutter signals to enable discrimination of small targets.

2. Description of the Prior Art

In the case of using a radar at sea, the sea reflection disturbance, i.e., the so-called clutter occurring due to waves, makes it difficult to discriminate small targets such as a buoy, a small craft and so on. For the suppression of such clutter, there have been proposed various systems such, for example, as an STC (Sensitivity Time Control) system, an FTC (Fast Time Constant) system, a logarithmic sensitivity receiving system, an AGC (Automatic Gain Control) system, an integrating system and so on. FIG. 1 shows one example of a waveform of an A-scope. The amplitude distribution is considered to be in proportion to $1/\sqrt[4]{R}$, R is distance. Where a small target lies at a point $a$, the frequency spectrum at the point $a$ becomes such, for example, as depicted in FIG. 2. In FIG. 2, reference character S indicates a small target signal and C indicates the spectrum of a clutter signal. If the receiving sensitivity is usual linear one, saturation is caused by the clutter at a short distance and if the gain is established to avoid saturation, the long distance sensitivity is lowered. Of course, suppression of the clutter and discrimination of a small target are impossible. The aforesaid STC system is designed to suppress the short distance sensitivity and, for example, a bias voltage of a waveform, which is large at the instant of sending a pulse but gradually becomes smaller, is impressed to a first intermediate frequency amplifying stage of a receiver. The clutter is suppressed by the bias voltage but, at the same time, the target signal is also suppressed, so that the target signal contained in the clutter signal cannot be discriminated. The FTC system is designed to remove the DC component from the clutter signal through the use of a differentiation of a small time constant. The waveform of the A-scope becomes such, for example, as depicted in FIG. 3 and the frequency spectrum at the point $a$ where a small target lies is such as depicted in FIG. 4. Accordingly, the DC component of the clutter signal is removed and, at the same time, the DC component of the target signal is removed to make the discrimination of the small target impossible.

The logarithmic sensitivity receiving system is designed to prevent saturation due to the clutter at a short distance but, where the ratio S/C of the target signal S and the clutter signal C is lower than OdB, the detection of the target is difficult. The AGC system also provides substantially the same sensitivity as the logarithmic receiving system by using an IAGC (Instantaneous Automatic Gain Control), but a time lag of the IAGC presents a problem. In the case of the ratio S/C being lower than OdB, the detection of the target is difficult as is the case with the logarithmic sensitivity receiving system.

Further, the integrating system is a combination of the logarithmic sensitivity receiving system, the FTC system and an integrator. With this system, the signal in the clutter is integrated by the integrator, by which the ratio S/C can be improved but since the DC component of the target signal is removed by the FTC system, the composite improving effect is little and the target detection is also difficult in the case of the ratio S/C being lower than OdB.

SUMMARY OF THE INVENTION

This invention is to provide a novel clutter signal suppression radar which is free from the aforesaid defects experienced in the prior art and capable of detecting a small target signal in a clutter signal and which lowers the DC component of the frequency spectrum of the clutter signal without lowering the DC component of the target signal and extracts the target signal in a frequency region in agreement with the spreading of the frequency spectrum of the target signal.

The clutter signal suppression radar of this invention is characterized by the provision of at least one antenna for emitting electric waves of different planes of polarization and receiving reflected waves respectively, a pair of logarithmic linear amplifiers for amplifying the signals of different planes of polarization received by the antenna, a pair of homodyne detectors supplied with the signal outputs from the amplifiers respectively and a pair of signal processors for extracting the frequency spectrum of a target signal contained in the signal outputs from the detectors.

BRIEF DESCRIPTION OF THE DRAWINGS

This invention will be more fully understood by the following description and the attached drawings, in which.

DESCRIPTION OF THE PREFERRED EMBODIMENTS

Figure 1:
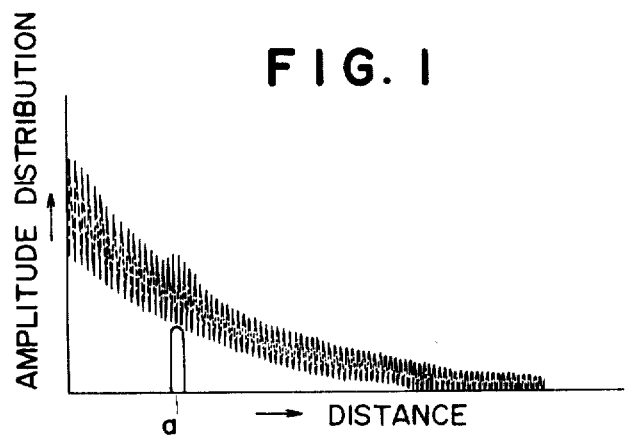
FIG. 1 is a graph showing one example of an A-scope waveform of sea reflection.
Figure 2:
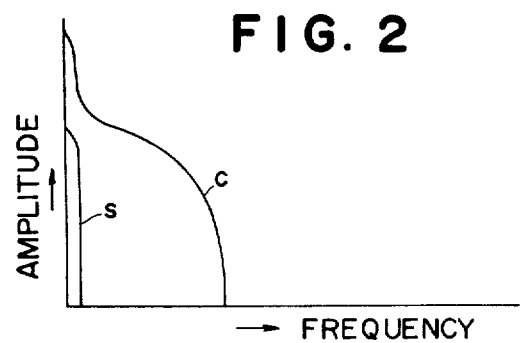
FIG. 2 is a graph showing the frequency spectrum of the example of FIG. 1 at a point $a$ where a small target lies.
Figure 3:
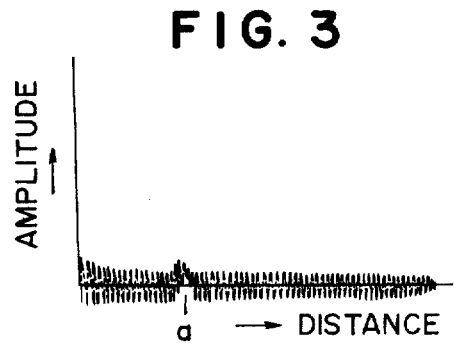
FIG. 3 is a graph illustrating one example of the A-scope waveform in a conventional FTC system.
Figure 4:
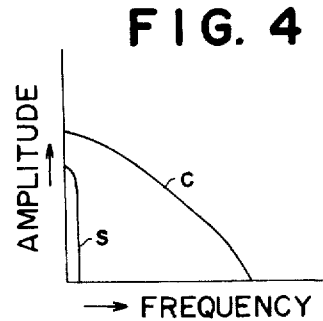
FIG. 4 is a graph showing the frequency spectrum of the example of FIG. 3 at a point $a$ where a small target lies.
Figure 5:
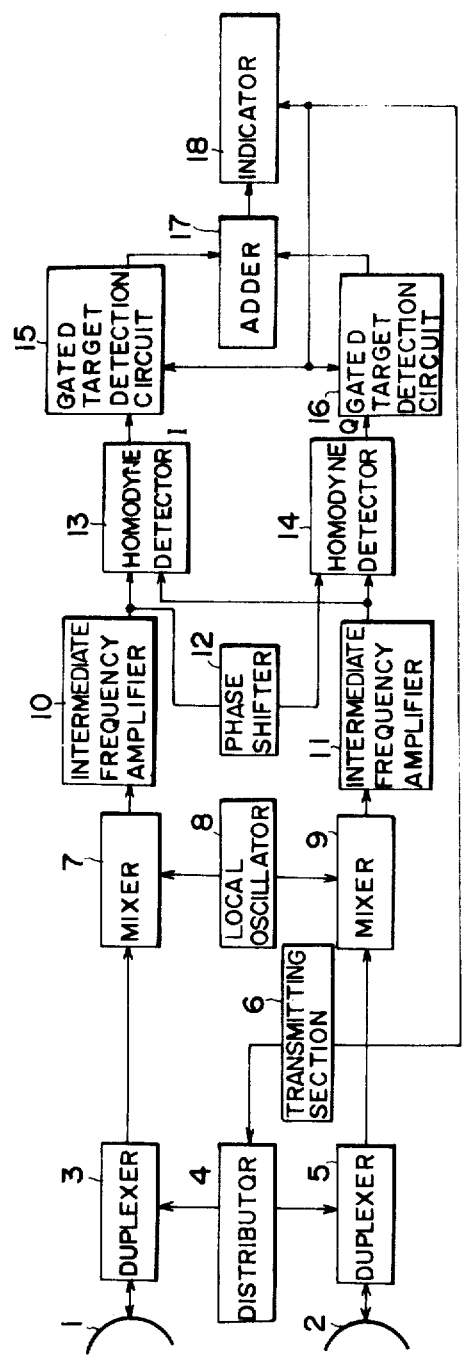
FIG. 5 is a block diagram of one example of this invention.

In FIG. 5, there is shown in block form one example of this invention. Reference numeral 1 indicates a horizontally polarized wave antenna, 2 refers to a vertically polarized wave antenna, 3 and 5 identify duplexers, 4 relates to a distributor whose power ratio is adjustable, 6 indicates a transmitting section for simultaneous transmission of horizontally polarized and vertically polarized waves, 7 and 9 refer to mixers, 8 identifies a local oscillator, 10 and 11 relate to logarithmic linear intermediate-frequency amplifiers whose input-output characteristic is logarithmic, 12 identifies a 90° phase shifter, 13 and 14 refer to homodyne detectors, 15 and 16 indicate GTD circuits effecting signal processing for removing clutter taking the form, for example, of gated target detection circuits each employing a detector and a filter adapted for a signal spectrum, 17 refers to an adder, and 18 indicates an indicator. Electric waves simultaneously emitted from the horizontally polarized and vertically polarized wave antennas 1 and 2 are reflected by the surface of the sea and a target. The vertically polarized wave component is applied to the homodyne detectors 13 and 14 through the vertically polarized wave antenna 2, the duplexer 5, the mixer 9 and the logarithmic linear intermediate-frequency amplifier 11. While, the horizontally polarized wave component is applied through the horizontally polarized wave antenna 1, the duplexer 3, the mixer 7 and the logarithmic linear intermediate-frequency amplifier 10 to the homodyne detector 13 and through the 90° phase shifter 12 to the homodyne detector 14. The 90° phase shifter 12 is provided for removing a blind phase due to the phase relationship between the target signals present in the horizontally polarized and vertically polarized waves, so that the 90° phase shifter 12 may be provided in either one of the horizontally polarized and vertically polarized wave receiving systems.

The outputs from the homodyne detectors 13 and 14 will hereinafter be I- and Q-channels. In the I-channel, the signal from a usual target appears in the form of an output dependent upon the amplitudes and phases of the received signals of the horizontally polarized and vertically polarized waves and this signal remains substantially unchanged in relation to time. On the other hand, the sea reflected signal is composed of scattered factors which undergo complicated changes. The amplitudes and phases of the received signals of the horizontally polarized and vertically polarized waves change every moment with different cycles, so that their detected outputs appear in the form of positive and negative noise-like outputs corresponding to their phases and amplitudes. In order to extract the usual target signal contained in the clutter signal, the clutter signal is almost removed by the GTD circuit 15 having a filter adapted for the frequency spectrum of the target signal.

Where the target is a moving one, a Doppler shift corresponding to its moving speed is caused, but, in this case, the horizontally polarized and vertically polarized wave signals rotate in exactly the same phase, so that the homodyne detected outputs can be handled in the same manner as in the case of an ordinary fixed target.

With the Q-channel, where the horizontally polarized and vertically polarized wave signals reflected from the ordinary target have a phase difference of 90° therebetween, their phases are detected by the homodyne detectors with either one of them being delayed 90°, thus removing a blind phase.

The clutter is removed by the GTD circuits 15 and 16 of the I- and Q-channels and the outputs therefrom are combined together by the adder 17 and the resulting composite signal is supplied to the indicator 18.

Figure 6:
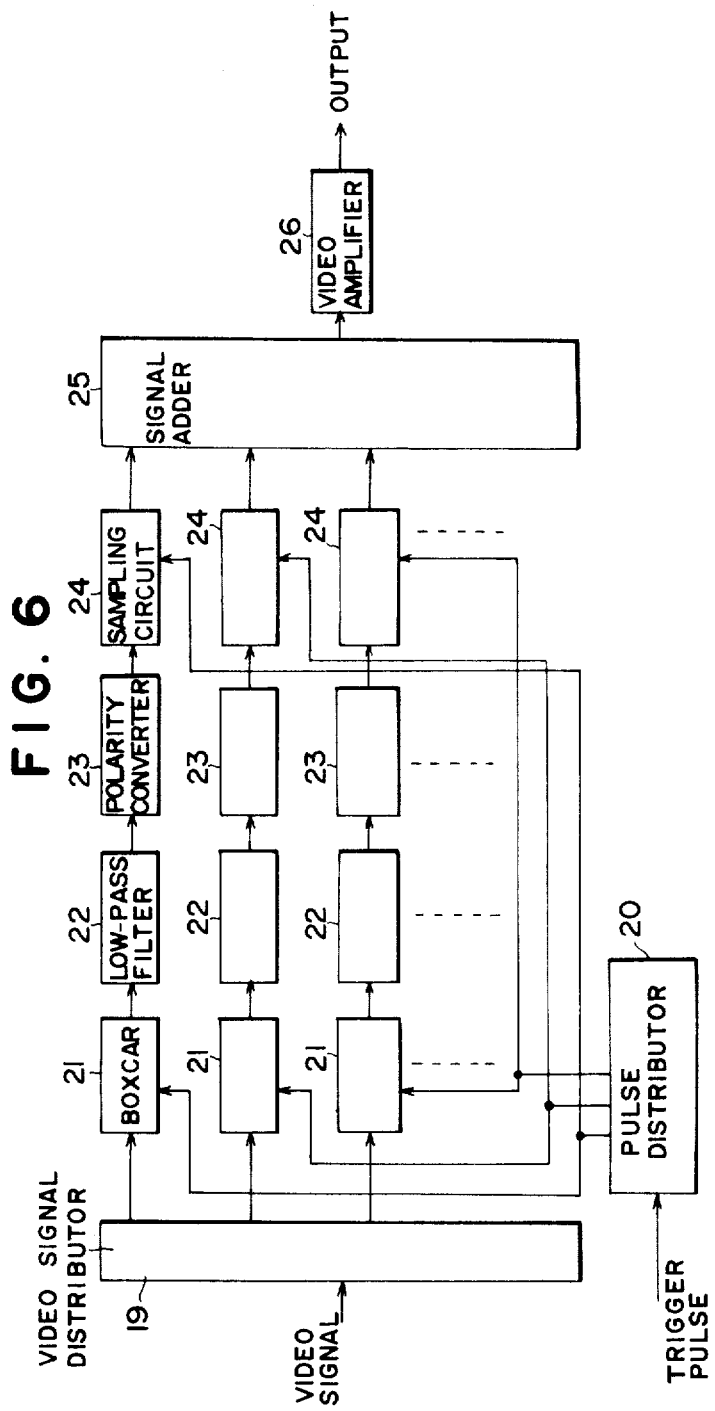
FIG. 6 is a block diagram of one example of a GTD circuit employed in the example of FIG. 5.

FIG. 6 illustrates in block form one example of the aforesaid GTD circuits 15 and 16. Reference numeral 19 designates a video signal distributor to distribute the received video signals into n channels corresponding to n ranges, for the signal integration operation, 20 refers to a pulse distributor for distributing a range gate pulse, 21 indicates boxcar detectors, 22 identifies low-pass filters permitting the passage therethrough of a stationary target signal, 23 indicates polarity converters for converting signals of both polarities into positive or negative signals, 24 refers to sampling circuits for providing distance information, 25 identifies a signal adder, and 26 refers to a video amplifier.

The output from the homodyne detector is applied to the video signal distributor 19 of the GTD circuit and the pulse distributor 20 is supplied with a trigger pulse from the transmitter to generate n's range gate pulses for a required range, which are supplied to the n's boxcar detectors 21 and the sampling circuits 24 disposed in accordance with respective ranges. The output from the video signal distributor 19 is applied to the detectors 21, each corresponding to a given range. Since the signals having passed through the detectors 21 and the filters 22 have no distance information, the signals of both polarities are sampled by the sampling circuits 24 into the original distance pulses corresponding to the respective ranges after being converted into positive or negative signals by the polarity converter 23. The signals thus sampled are combined together by the signal adder 25 to provide a composite signal, which is amplified by the video amplifier 26. The composite signal of each of the I- and Q-channels thus obtained is combined by the adder 17 with that of the other channel.

Figure 7:
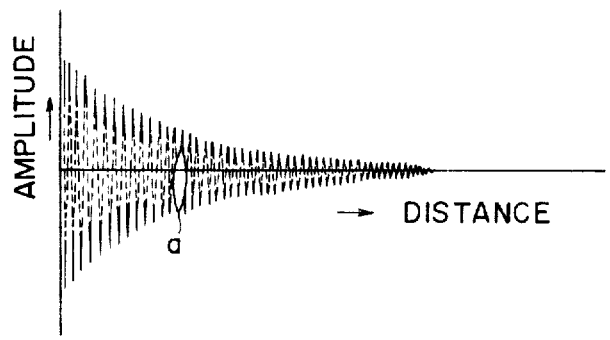
FIGS. 7, 8, 9 and 10 respectively show A-scope waveforms and their frequency spectrums, for explaining the operation of the circuit of FIG. 6.
Figure 8:
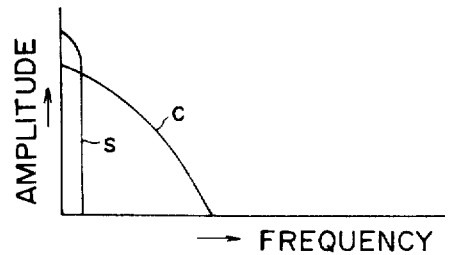
Figure 9:
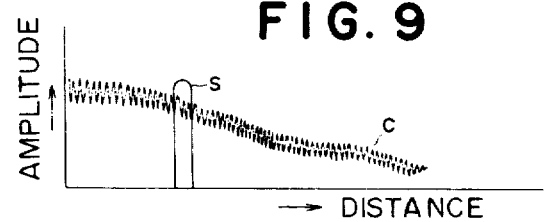
Figure 10:
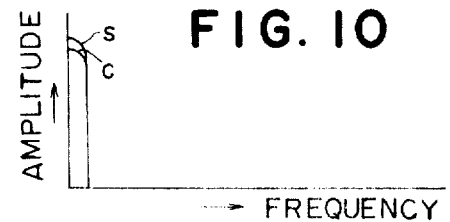

FIG. 7 shows one example of the waveform of the A scope according to this invention, and the signal of that waveform is applied to the video signal distributor 19 of FIG. 6. The phase difference between the vertically polarized and horizontally polarized waves and their amplitudes change every moment with respect to the clutter, but the phase difference and the amplitude change with very long periods with respect to a target. Utilizing this fact, the vertically polarized and horizontally polarized waves are amplified by a logarithmic intermediate-frequency amplifier, while holding the phase and amplitude information, in such a manner as to permit subsequent phase detection. Then, the DC component of the clutter is removed by phase detection. Further, the composite frequency spectrum of a target signal S at a point a where a target lies and a clutter signal C is such as depicted in FIG. 8 and the output from the GTD circuit becomes such as shown in FIG. 9. Therefore, in the case of a stationary target, if higher-frequency components of the clutter signal C are removed by a low-pass filter, such a composite frequency spectrum as shown in FIG. 10 is obtained, thus providing a greatly improved S/C ratio. Consequently, even if a small target signal is buried in the clutter signal, it can be readily detected.

In the foregoing, the planes of polarization of electric waves are horizontal and vertical but this invention is not limited specifically thereto and desired planes of polarization anc circular polarized waves can also be employed. Further, the signal processing system has been described with regard to the GTD circuit but, for example, a digital integrator circuit, a delay line integrator circuit or the like can also be employed.

In accordance with this invention, as described in the foregoing, electric waves of different planes of polarization are used; received signals of different planes of polarization are amplified by high-frequency amplifiers of logarithmic sensitivity and phase detected by homodyne detectors to remove therefrom the DC components of clutter signals contained therein, the signals are detected, for example, by detectors actuated by range gate pulses; the detected outputs are applied to filters permitting the passage therethrough of the frequency spectrum of a target signal to suppress the clutter signals; the filtered outputs are sampled by range gate pulses to provide distance information; and the sampled outputs are combined together. Thus, a signal of a level lower than the clutter signal level, that is, a small target buried in the sea reflected waves can be detected. Consequently, small targets on the sea such a buoy, a small craft and so on, which could not have been discriminated due to clutter, can be detected by suppressing the clutter according to this invention, as described in the foregoing.

It will be apparent that many modifications and variations may be effected without departing from the scope of the novel concepts of this invention.

What is claimed is:

1. A clutter signal suppression radar system comprising:
   antenna means for emitting at least first and second waves of different polarizations and for receiving corresponding first and second reflected waves and producing in response thereto corresponding first and second reflected wave signals;
   first and second amplifier means, each having a linear logarithmic input-output characteristic, for amplifying said first and second reflected wave signals, respectively in amplitude while retaining the phases of the respective wave signals and producing corresponding first and second amplified output signals;
   phase detector means for receiving said first and second amplified output signals of said first and second amplifier means and producing an output signal in response to the phase difference between said first and second output signals; and
   means for extracting frequency spectrums of target signals contained in the phase difference output signals of said phase detector means.

2. A clutter signal suppression radar system according to claim 1, wherein the first and second waves of different polarizations comprise horizontally polarized and vertically polarized waves, respectively.

3. A clutter signal suppression radar system as claimed in claim 2, wherein there is further provided:
   means for shifting said first amplified output signal of said first amplifier by 90°; and
   said phase detector means receives said second output signal of said second amplifier means and said shifted output signal from said shifting means and produces an output in response to the phase difference therebetween.

4. A clutter signal suppression radar system as claimed in claim 3 wherein:
   said phase detector means comprises first and second phase detectors, said first phase detector receiving the outputs of said first and second amplifier means and producing an output in accordance with the phase difference therebetween, and said second phase detector receiving the outputs of said phase shifter and said second amplifier and producing an output in accordance with the phase difference therebetween;
   said frequency spectrum extracting means comprises first and second extracting means, respectively receiving the outputs of said first and second phase detectors; and there is further provided
   means for adding the outputs of said first and second frequency extracting means to produce a distance indicating signal output.

5. A clutter signal suppression radar system comprising:
   at least one antenna for emitting at least first and second waves of different planes of polarization and receiving corresponding first and second reflected waves to produce corresponding, reflected wave signals;
   first and second amplifier means, each having a linear logarithmic input-output characteristic for amplifying said first and second reflected wave signals respectively in amplitude while retaining the phases of the respective wave signals and producing corresponding first and second amplified output signals;
   first and second phase detectors, each for receiving said first and second amplified output signals and effecting detection on the basis of either one thereof;
   means for shifting through 90° any one of the four input signals applied to said first and second phase detectors; and
   first and second signal processors for extracting frequency spectrums of target signals contained in the signal outputs derived respectively from said first and second detectors.

* * * * *

UNITED STATES PATENT OFFICE
CERTIFICATE OF CORRECTION

Patent No. 3,918,055　　　　　　　　Dated November 4, 1975

Inventor(s) Hirotoshi Shimizu et al.

It is certified that error appears in the above-identified patent and that said Letters Patent are hereby corrected as shown below:

On the face of the patent, at "[73]", change "Fugitsu Limited" to read -- Fujitsu Limited --.

*Signed and Sealed this*

Twenty-first *Day of* September 1976

[SEAL]

*Attest:*

RUTH C. MASON
*Attesting Officer*

C. MARSHALL DANN
*Commissioner of Patents and Trademarks*